(12) United States Patent
Yamasaki

(10) Patent No.: US 8,928,958 B2
(45) Date of Patent: Jan. 6, 2015

(54) IMAGE READING DEVICE INCLUDING AN OPTICAL UNIT FOR READING A DOCUMENT IMAGE, IMAGE FORMING APPARATUS THEREWITH, AND OPTICAL UNIT FOR READING A DOCUMENT IMAGE

(71) Applicant: KYOCERA Document Solutions Inc., Osaka (JP)

(72) Inventor: Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/154,332

(22) Filed: Jan. 14, 2014

(65) Prior Publication Data

US 2014/0198356 A1    Jul. 17, 2014

(30) Foreign Application Priority Data

Jan. 16, 2013    (JP) .................................. 2013-005287

(51) Int. Cl.
*H04N 1/04*        (2006.01)
*H04N 1/10*        (2006.01)

(52) U.S. Cl.
CPC ........... *H04N 1/1017* (2013.01); *H04N 1/1026* (2013.01); *H04N 1/103* (2013.01); *H04N 2201/0081* (2013.01); *H04N 2201/0456* (2013.01)
USPC ........................................................ 358/484

(58) Field of Classification Search
None
See application file for complete search history.

(56) References Cited

U.S. PATENT DOCUMENTS

| | | | | |
|---|---|---|---|---|
| 6,194,713 | B1 * | 2/2001 | Kanazawa | 250/234 |
| 6,285,441 | B1 * | 9/2001 | Takahara | 355/67 |
| 7,405,849 | B2 * | 7/2008 | Chen | 358/493 |
| 7,768,679 | B2 * | 8/2010 | Yamaguchi | 358/497 |
| 8,218,204 | B2 * | 7/2012 | Hozono | 358/474 |
| 8,508,808 | B2 * | 8/2013 | Shimizu et al. | 358/474 |
| 8,587,841 | B2 * | 11/2013 | Murray | 358/474 |
| 2001/0043371 | A1 * | 11/2001 | Takahara | 358/471 |

FOREIGN PATENT DOCUMENTS

| | | |
|---|---|---|
| JP | 10-186535 A | 7/1998 |
| JP | 2002-262032 A | 9/2002 |

\* cited by examiner

*Primary Examiner* — Jeremiah Bryar
(74) *Attorney, Agent, or Firm* — Morgan, Lewis & Bockius LLP

(57) ABSTRACT

An image reading device has an optical unit and a rail portion formed of sheet metal. The optical unit is scanned in the sub scanning direction to read an image on a document on a contact glass. The rail portion slidably supports the optical unit. The optical unit has a sliding portion which slides on the rail portion while making contact therewith, and at least one pair of gripping portions which grip the rail portion. The surface of the sliding portion has a substantially arc-shaped cross section. The rail portion has two inclined surfaces that make contact with the substantially arc-shaped surface at two points.

7 Claims, 7 Drawing Sheets

IMAGE READING DEVICE INCLUDING AN OPTICAL UNIT FOR READING A DOCUMENT IMAGE, IMAGE FORMING APPARATUS THEREWITH, AND OPTICAL UNIT FOR READING A DOCUMENT IMAGE

INCORPORATION BY REFERENCE

This application is based on and claims the benefit of Japanese Patent Application No. 2013-005287 filed on Jan. 16, 2013, the contents of which are hereby incorporated by reference.

BACKGROUND

The present disclosure relates to an image reading device, an image forming apparatus provided therewith, and an optical unit. More particularly, the present disclosure relates to an image reading device including an optical unit movable in a sub scanning direction, an image forming apparatus provided with such an image reading device, and an optical unit.

Some image reading devices designed for incorporation in multifunction peripherals and the like exploiting an electrophotographic process are furnished with a document transport device that feeds sheets of a document successively onto a document stage (glass plate) to allow them to be read and that then, after completion of reading, discharges them off the document stage. Such image reading devices permit document reading by two different methods: by a sheet-through method, in which sheets of a document are read successively while being transported automatically by the document transport device with a document presser kept closed; and by a fixed-document method, in which for each sheet of a document, a document presser is opened and closed to allow it to be placed on a document stage in exchange for any previous one and a scanner unit is moved to read it. Incidentally, in the sheet-through method mentioned first, document reading proceeds while the scanner unit inside the image reading device is held at a predetermined reading position without being moved for scanning. By contrast, in the fixed-document method mentioned later, document reading proceeds while the scanner unit is moved for scanning in the sub scanning direction.

One known planar scanning device (image reading device) permits document reading by the two methods, that is, the sheet-through and fixed-document methods. This planar scanning device is provided with a document stage glass (contact glass) on which a document is placed, an optical unit arranged under the document stage glass and including a scanner unit which is scanned in the sub scanning direction to read an image on the document on the document stage glass, a guide shaft (rail portion) which supports the optical unit such that this is slidable in the sub scanning direction, and a timing belt which enables the optical unit to move in the sub scanning direction. In a bottom part of the optical unit, a bearing that slides relative to the guide shaft is provided Another known image reading device is provided with, like the planar scanning device mentioned above, an optical unit including a scanner unit (close-contact image sensor unit) which reads an image on a document, a rail portion which supports the optical unit such that this is slidable in the sub scanning direction, and a driving mechanism which enables the optical unit to move in the sub scanning direction, wherein in a bottom part of the optical unit, a bearing that slides relative to the rail portion is provided.

As shown in FIG. 11, in these two image reading devices, a shaft 101 with a circular or oval cross section is used as the rail portion, and in a lower part of the optical unit, a bearing (sliding portion) 102 having a recess 102a with a semi-circular or semi-oval cross section is provided. As shown in FIG. 12, another known sliding portion 103 has a square-cornered U shape so as to make contact with a shaft 101 with a circular cross section on three surfaces.

On the other hand, scanner units can read images by different methods, namely a CCD sensor method employing a CCD (charge-coupled device) sensor and a CIS sensor method employing a CMOS (complementary MOS) sensor.

With the CIS sensor method, the depth of field is small, and this requires the distance from the document to be maintained with high accuracy.

Accordingly, in a CIS sensor method, a scanner unit adopting a CIS sensor method is kept in close contact with the bottom surface of a contact glass. Specifically, a spring for biasing the scanner unit upward is provided, and on the top surface of the scanner unit, a sliding member that slides on the contact glass while keeping contact with it is provided. This helps keep a constant distance between the scanner unit and the document.

However, in cases where, as in the two image reading devices mentioned above, a shaft (rail portion) 101 with a circular or oval cross section supports a bearing (sliding portion) 102 having a recess 102a with a semi-circular or semi-oval cross section or a sliding portion 103 with a square-cornered U shape providing contact on three surfaces, tolerated dimensional errors cause rattling between the shaft 101 and the sliding portion 102 or 103. As a result, when the optical unit is scanned in the sub scanning direction, vibration occurs, inconveniently resulting in lower image reading accuracy.

Conceived to solve the problems discussed above, the present disclosure aims to provide an image reading device that can suppress lowering of image reading accuracy, an image forming apparatus provided with such an image reading device, and an optical unit.

SUMMARY

According to one aspect of the present disclosure, an image reading device is provided with a contact glass, an optical unit, and a rail portion formed of sheet metal. On the contact glass, a document is placed. The optical unit is arranged under the contact glass, and is scanned in the sub scanning direction to read an image on the document placed on the contact glass. The rail portion extends in the sub scanning direction, and supports the optical unit such that this is slidable in the sub scanning direction. The optical unit includes a sliding portion which slides on the rail portion while keeping contact with it, and at least one pair of gripping portions which grip the rail portion from both sides in the main scanning direction. The surface of one of the sliding portion and the rail portion has a substantially arc-shaped cross section, and the other of the sliding portion and the rail portion has two inclined surfaces that make contact with the substantially arc-shaped surface at two points as seen in a cross-sectional view.

This and other objects of the present disclosure, and the specific benefits obtained according to the present disclosure, will become apparent from the description of embodiments which follows.

DETAILED DESCRIPTION

Hereinafter, embodiments of the present disclosure will be described with reference to the accompanying drawings.

Figure 1:
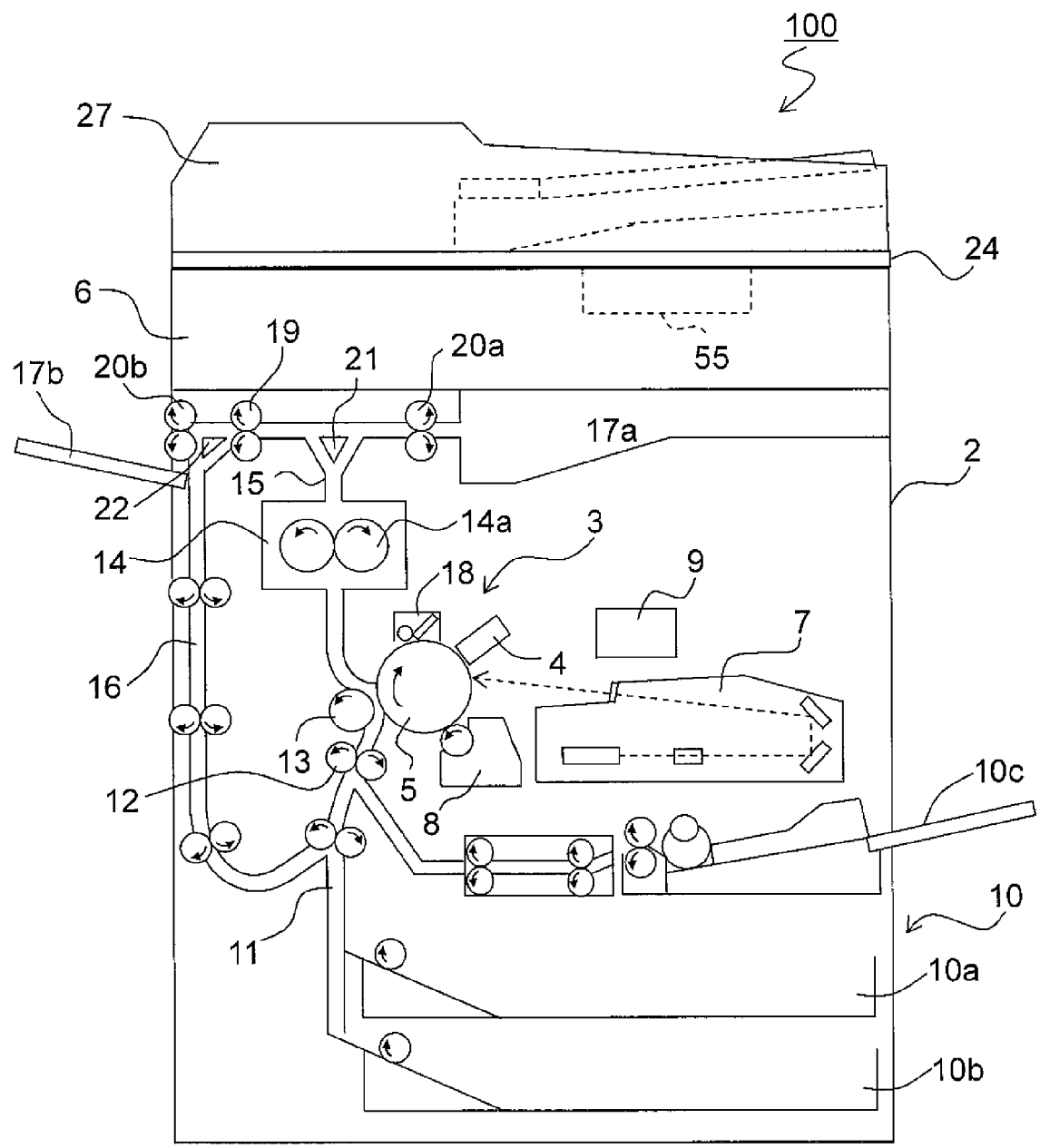
FIG. 1 is a sectional view schematically showing the structure of an image forming apparatus provided with an image reading device according to one embodiment of the present disclosure.

With reference to FIGS. 1 to 9, the structure of an image forming apparatus 100 provided with an image reading device 6 according to one embodiment of the present disclosure will be described. In FIG. 1, in the image forming apparatus 100, when copying operation is performed, image data of a document is read and converted into an image signal in the image reading device 6, which will be described later. On the other hand, in an image formation section 3 inside a main body 2 of a multifunction peripheral, a photosensitive drum 5, which rotates clockwise as seen in the figure, is electrically charged uniformly by a charging unit 4, an electrostatic latent image is formed on the photosensitive drum 5 by a laser beam from am exposure unit 7 based on the document image data read by the image reading device 6, and developer (hereinafter referred to as toner) is made to adhere to the electrostatic latent image by a developing unit 8 to produce a toner image. The toner is supplied to the developing unit 8 from a toner container 9.

Toward the photosensitive drum 5 having the toner image formed on it as described above, a sheet of a printing medium is transported from a sheet feed mechanism 10 via a sheet transport passage 11 and a registration roller pair 12 to the image formation section 3, so that, in the image formation section 3, the toner image on the surface of the photosensitive drum 5 is transferred to the sheet by a transfer roller 13 (an image transfer section). The sheet having the toner image transferred to it is then separated from the photosensitive drum 5, and is transported to a fusing section 14 having a fusing roller pair 14a, where the toner image is fused. The sheet having passed through the fusing section 14 is transported to a sheet transport passage 15, which branches into a plurality of directions. The sheet is then distributed between different transport directions by a path switching mechanism 21,22 which is provided at the branch point in the sheet transport passage 15 and has a plurality of path switching guides. The sheet is then, as it is (or after being transported to a sheet transport passage 16 for two-side copying), discharged via a discharge roller pair 20a or a discharge roller pair 20b onto a sheet discharge section including a first discharge tray 17a and a second discharge tray 17b.

Although not illustrated, an antistatic device is provided on the downstream side of a cleaning device 18. The sheet feed mechanism 10 is detachably attached to the main body 2, and is provided with a plurality of sheet feed cassettes 10a and 10b, in which sheets of printing media are accommodated, and a hand-feed tray 10c, which is provided above them. These are connected via a sheet transport passage 11 to the image formation section 3 comprising the photosensitive drum 5, the developing unit 8, etc.

In a top part of the main body 2, the image reading device 6 is arranged. On the top surface of the main body 2, a platen (a document presser) 24 for pressing and holding a document placed on a contact glass 25 (see FIG. 3) is provided such that the platen 24 can be opened and closed. On the platen 24, a document transport device 27 that automatically transports a document to the image reading device 6 is fitted. It should be noted that, throughout the present disclosure, a sheet or sheets of a document are also referred to simply as a document.

Figure 2:
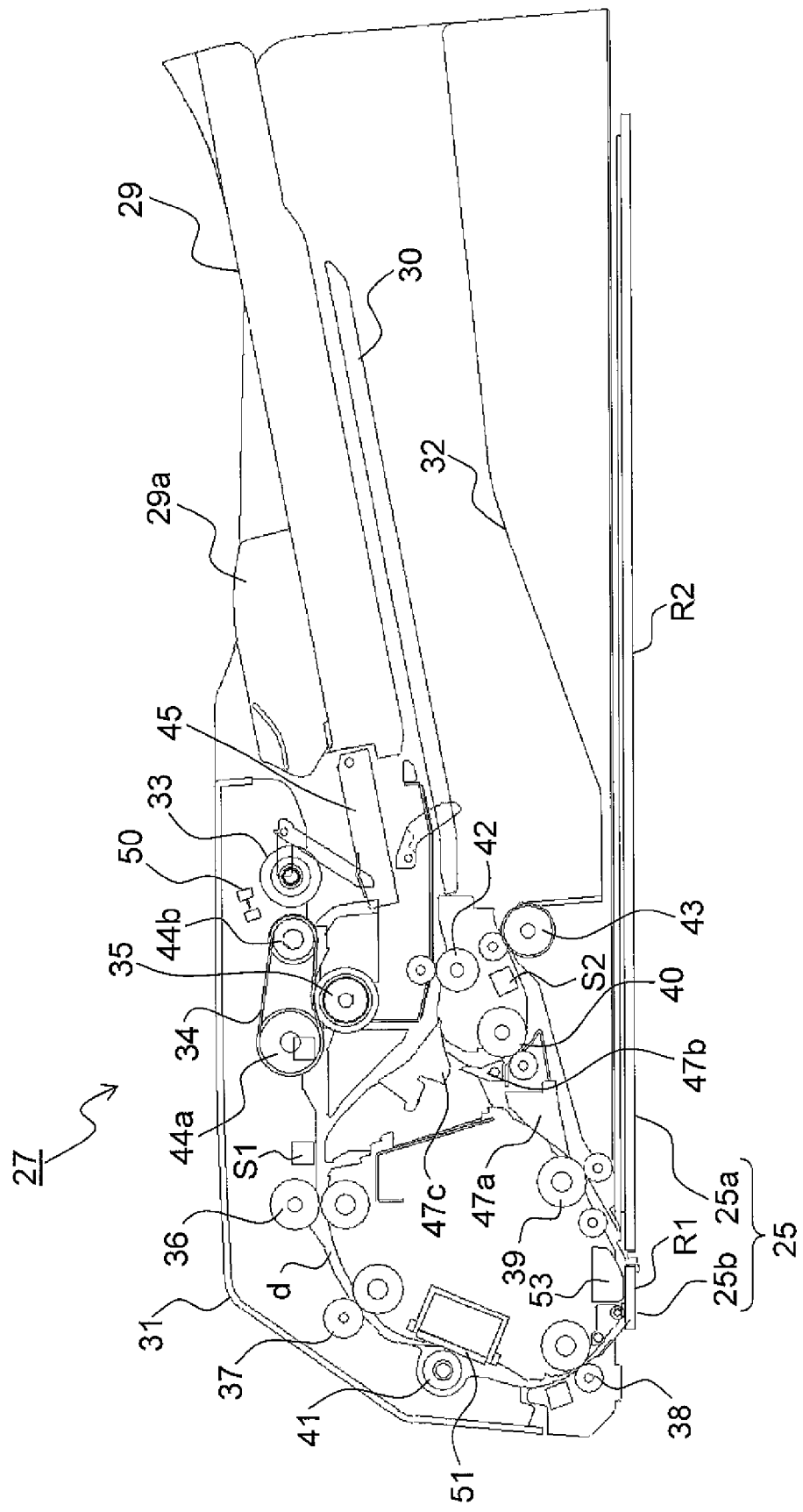
FIG. 2 is a sectional view showing the structure of a document transport device in an image forming apparatus according to one embodiment of the present disclosure.

As shown in FIG. 2, inside a cover member 31 of the document transport device 27, a document transport passage d is formed which leads from a document feed tray 29 to a document discharge tray 32. Along the document transport passage d, document transport members are provided which comprise a pickup roller 33, a sheet feed belt 34, a separation roller 35, a registration roller pair 36, transport roller pairs 37, 38, 39, and 40, a CIS roller 41, a reversing roller pair 42, a discharge roller pair 43, etc.

The sheet feed belt 34 is wound around a driving roller 44a and a following roller 44b, and is kept in contact with the separation roller 35 from below under a predetermined pressure. The separation roller 35 incorporates a torque limiter so that, only when the rotation load is below a predetermined torque, the separation roller 35 rotates in the direction reverse to the sheet feed belt 34 while, when the rotation load is above the predetermined torque, the separation roller 35 rotates to follow the sheet feed belt 34. Over the pickup roller 33, a top surface detection sensor 50 for detecting the top surface position of the document is arranged.

The contact glass 25 comprises an automatic reading contact glass 25b and a hand-placed document contact glass 25a, and is provided with (though neither is illustrated) a white reference panel for shading correction, which is arranged opposite the automatic reading contact glass 25b, and a document presser, which is provided over the white reference panel to press it against the automatic reading contact glass 25b. The document transport passage d is so curved as to be reversed between the registration roller pair 36 and the automatic reading contact glass 25b. The document transport passage d is provided with, at appropriate positions, a plurality of sheet detection sensors including a sheet feed sensor S1 for detecting presence/absence or passage of a document and a discharge sensor S2.

In the sheet-through method, first, a plurality of sheets of a document are placed, image surface up, on the document feed tray 29; then, when a copy start button on an operation panel 55 (see FIG. 3) is pressed, a lift plate 45 raised by a lifting mechanism (not illustrated) presses the pickup roller 33 upward via the document; then, the weight of a frame member (not illustrated) including the pickup roller 33 acts on the lift plate 45, causing the top surface of the document to be pressed against the pickup roller 33 under a predetermined sheet feeding pressure.

Out of the document placed on the document feed tray 29, typically a plurality of sheets in the topmost tier are fed to the nip portion between the sheet feed belt 34 and the separation roller 35. Of those sheets, only the topmost one is separated by the separation roller 35, and is transported toward the registration roller pair 36. At this time, the document is transported over a predetermined distance after the leading edge of the document is detected by the sheet feed sensor S1; then, the roller driving motor stops operating, and thus the pickup roller 33 and the sheet feed belt 34 stop being driven to rotate, thus ending primary sheet feeding. The document thus having undergone primary sheet feeding is then stopped with its leading edge at the nip portion of the registration roller pair 36, with a sag formed.

Then, a secondary sheet feeding motor (not illustrated) operates to drive the registration roller pair 36 to rotate. The document is transported, by the registration roller pair 36, the transport roller pairs 37-39, and the CIS roller 41, via the automatic reading contact glass 25b toward the discharge roller pair 43. Eventually, the document is discharged onto the document discharge tray 32 by the discharge roller pair 43. At this time, the discharge sensor S2 detects passage of the trailing edge of the document, and thus completion of reading of a single document sheet is detected.

Here, the discharge sensor S2 has a counting function whereby it counts the number of document sheets every time transport of a sheet is completed. So long as the sheet feed sensor S1 detects a subsequent sheet, transport of the second and following sheets is continued in a similar manner as descried above. Incidentally, while the document passes across the automatic reading contact glass 25b, it remains in contact with a transport guide 53, and this permits the image on the document to be read through the automatic reading contact glass 25b by the image reading device 6 (see FIG. 1).

A two-side document is read by one of two methods. In a single-stage reading method, the image on the reverse surface of a document is read by a contact image sensor 51 provided opposite the CIS roller 41, while the image on the obverse surface of the document is read through the automatic reading contact glass 25b. In a two-stage reading method, first the image on the obverse surface of a document is read through the automatic reading contact glass 25b; then the document sheet is distributed to a reversing tray 30 by branching claws 47a, 47b, and 47c, and the reversing roller pair 42 is rotated in the reverse direction so that the document, now reverse surface up, is once again transported to the upstream side of the registration roller pair 36; then the image on the reverse surface of the document is read through the automatic reading contact glass 25b.

Figure 3:
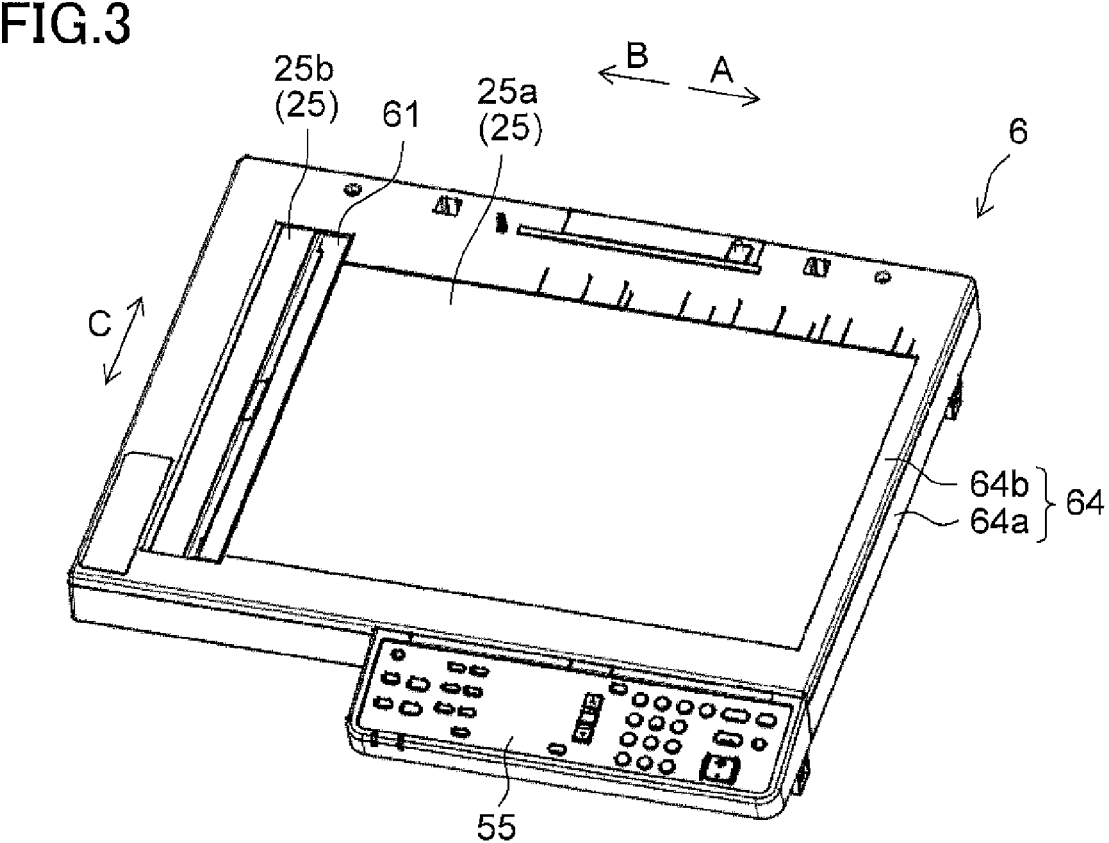
FIG. 3 is a perspective view showing the structure of an image reading device according to one embodiment of the present disclosure.

As shown in FIG. 3, the image reading device 6 includes: a contact glass 25 comprising a hand-placed document contact glass 25a, on which a document is placed, and an automatic reading contact glass 25b, across the top surface of which an automatically transported document passes; a resin member 61 arranged between the hand-placed document contact glass 25a and the automatic reading contact glass 25b; a scanner unit 62 (see FIG. 4) arranged under the contact glass 25 to read the image on the document; a carriage 63 (see FIG. 4) which holds the scanner unit 62 and is arranged so as to be reciprocally movable in the sub scanning direction (the direction indicated by arrows A and B); and a casing (frame) 64 formed of resin comprising a lower frame 64a and an upper frame 64b for housing the scanner unit 62, the carriage 63, etc. Here, the scanner unit 62 and the carriage 63, along with compression coil springs 68 (see FIG. 5) and a slider 65 (see FIG. 5), which will be described later, constitute an optical unit 70 which is arranged under the contact glass 25 and is scanned in the sub scanning direction to read the image on the document placed on the contact glass 25.

Figure 4:
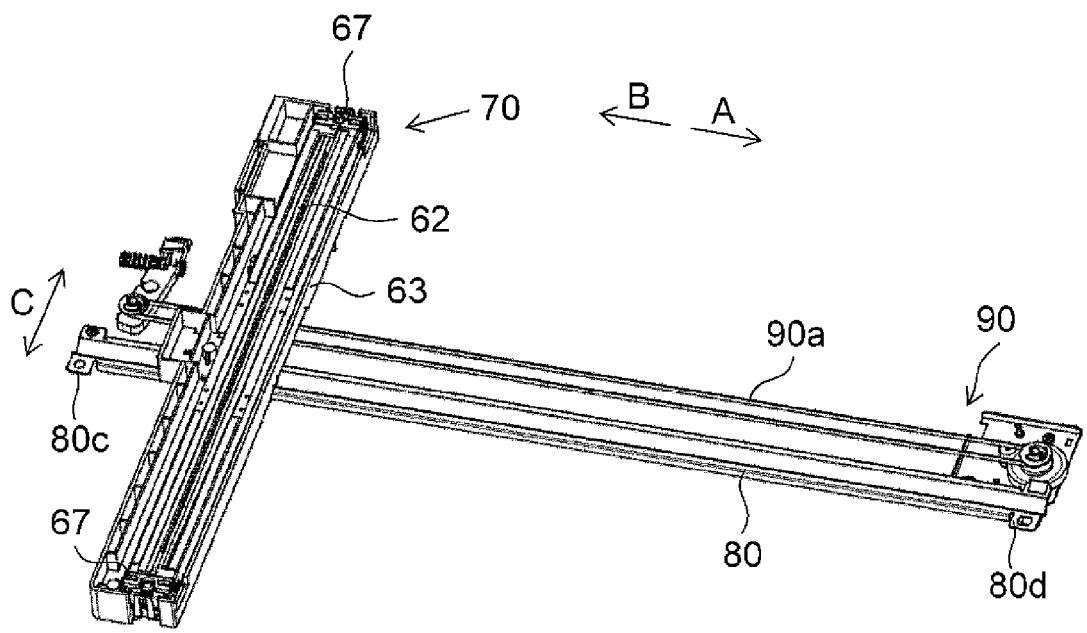
FIG. 4 is a perspective view showing an optical unit, a rail portion, and a driving device in an image reading device according to one embodiment of the present disclosure.

As shown in FIG. 4, the image reading device 6 further includes: a rail portion 80 which extends in the sub scanning direction and which supports the optical unit 70 such that it is slidable in the sub scanning direction; and a driving device 90 which enables the optical unit 70 to move reciprocally in the sub scanning direction.

As shown in FIG. 3, edge parts of the bottom surfaces of the hand-placed document contact glass 25a and the automatic reading contact glass 25b are placed on wall parts of the lower frame 64a. Edge parts of the top surfaces of the hand-placed document contact glass 25a and the automatic reading contact glass 25b are bonded to the upper frame 64b with an unillustrated adhesive layer. The resin member 61 is formed integrally with the upper frame 64b.

The automatic reading contact glass 25b and the resin member 61 are formed in an elongate shape extending in the main scanning direction. The resin member 61 has an inclined surface for guiding, as if scooping up, the document that is automatically transported to pass across the automatic reading contact glass 25b. A part of the resin member 61 abutting the hand-placed document contact glass 25a serves as a datum surface against which a document is struck when placed manually, and bears markings indicating document positions and sizes.

Figure 5:
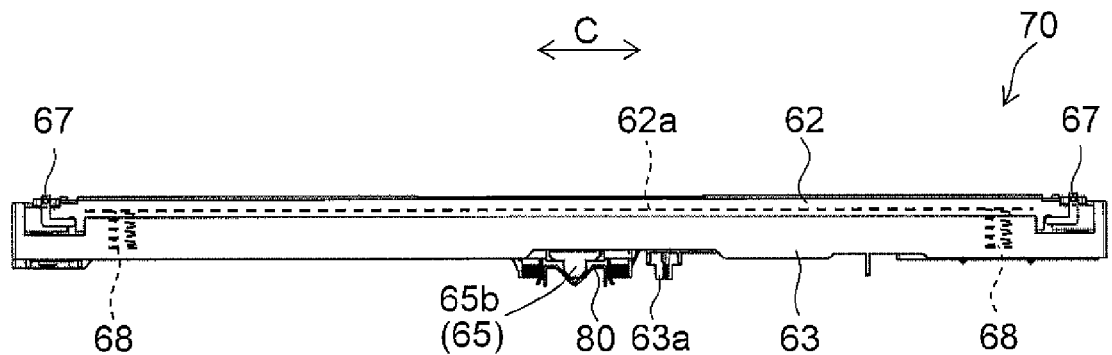
FIG. 5 is a sectional view showing the structure of an optical unit in an image reading device according to one embodiment of the present disclosure.
Figure 6:
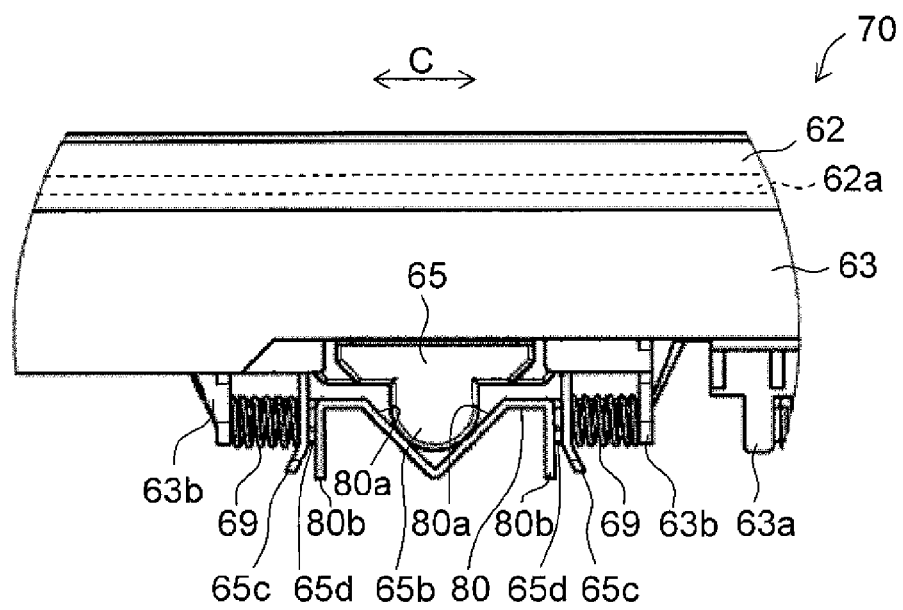
FIG. 6 is an enlarged view showing the structure of a slider and a rail portion in an image reading device according to one embodiment of the present disclosure.

As shown in FIGS. 5 and 6, the scanner unit 62 includes an unillustrated light source and a CIS sensor 62a. The light emanating from the light source is reflected on the document, and is received by the CIS sensor 62a. The scanner unit 62 has its home position right under the white reference panel (not illustrated). Incidentally, unlike a scanner unit adopting a CCD sensor method, the scanner unit 62 adopting a CIS sensor method has no mirror.

In both end parts of the top surface of the scanner unit 62 in the main scanning direction (the direction indicated by arrow C), sliding members 67 are provided which slide on the bottom surface of the contact glass 25 while keeping contact with it.

The carriage 63 is provided with a plurality of compression coil springs (a second biasing member) 68 and the scanner unit 62 arranged over the compression coil springs 68. The compression coil springs 68 are arranged one in each of one and the other end parts of the carriage 63 in the main scanning direction. The scanner unit 62 is biased upward by the compression coil springs 68, and the sliding members 67 are pressed against the bottom surface of the contact glass 25. This keeps a constant distance between the scanner unit 62 adopting a CIS sensor method, which has a small depth of field, and the document image surface, and allows the document image to be read uniformly.

On the bottom surface of the carriage 63, an engagement projection 63a is provided integrally with it which engages with the driving device 90 so as to be pulled by it. The engagement projection 63a is arranged in a part of the carriage 63 displaced to one side from its center.

To the bottom surface of the carriage 63, a slider 65 is fastened which moves in the sub scanning direction (the direction indicated by arrows A and B) while holding the carriage 63.

Figure 7:
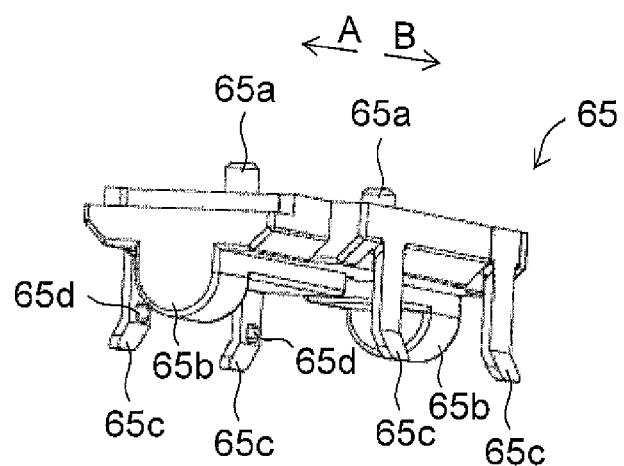
FIG. 7 is an enlarged perspective view showing the structure of a slider in an image reading device according to one embodiment of the present disclosure.

The slider 65 is arranged right under the position of the center of gravity of the optical unit 70 in the main scanning direction. As shown in FIGS. 6 and 7, the slider 65 has, resin-molded integrally with it, a plurality of fastening projections 65a (see FIG. 7) provided on a placement surface (top surface) on which the carriage 63 is placed, sliding portions 65b making slidable contact with the rail portion 80, and gripping portions 65c formed to extend downward.

The fastening projections 65a are provided one in each of one and the other side parts of the slider 65 in the sub scanning direction (the direction indicated by arrows A and B). The fastening projections 65a are press-fitted into insertion holes (not illustrated) in the carriage 63, and thereby the slider 65 is fastened to the carriage 63.

The bottom surfaces of the sliding portions 65b are formed so as to have a substantially arc-shaped cross section, and slide on the rail portion 80 while keeping contact with it. The sliding portions 65b are provided one in each of one and the other side parts of the slider 65 in the sub scanning direction. Only one sliding portion 65b may instead be provided so as to extend in the sub scanning direction.

The gripping portions 65c are provided one at each end of the slider 65 in the main scanning direction (the direction indicated by arrow C), and are provided so as to grip the rail portion 80 from both sides in the main scanning direction. The gripping portions 65c are provided in pairs, one pair in each of one and the other side parts of the slider 65 in the sub scanning direction. Only one pair of gripping portions 65c may instead be provided.

The gripping portions 65c are formed so as to be elastically deformable in the main scanning direction. On the inner surfaces of the gripping portions 65c in the main scanning direction, projections 65d are formed which slide on the rail portion 80 while keeping contact with it. The bottom ends of the gripping portions 65c are formed so as to bend outward in the main scanning direction. This allows the slider 65 to be attached to the rail portion 80 easily.

Figure 8:
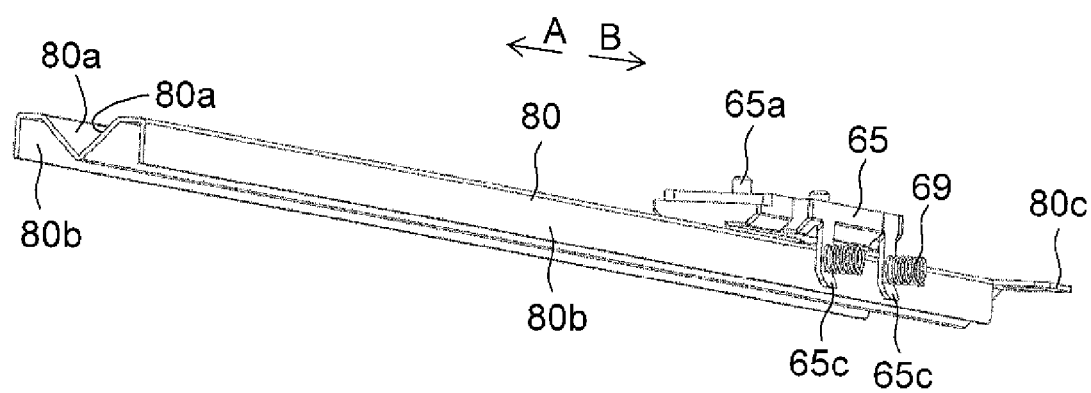
FIG. 8 is a perspective view showing the structure of a slider and a rail portion in an image reading device according to one embodiment of the present disclosure.

As shown in FIGS. 6 and 8, the rail portion 80 is formed by bending sheet metal, and is formed so as to have a substantially M-shaped cross section. The rail portion 80 has formed in it two inclined surfaces 80a, side wall portions 80b arranged at both sides in the main scanning direction (the direction indicated by arrow C), and a fastening portion 80c and a fitting portion 80d (see FIG. 4) which are fitted to the casing 64 (see FIG. 3).

The two inclined surfaces 80a are inclined relative to the horizontal plane, and abut the sliding portions 65b of the slider 65 while gripping them in the main scanning direction. Thus, the sliding portions 65b of the slider 65 and the two inclined surfaces 80a of the rail portion 80 make contact with each other at two points as seen in a cross-sectional view.

Figure 9:
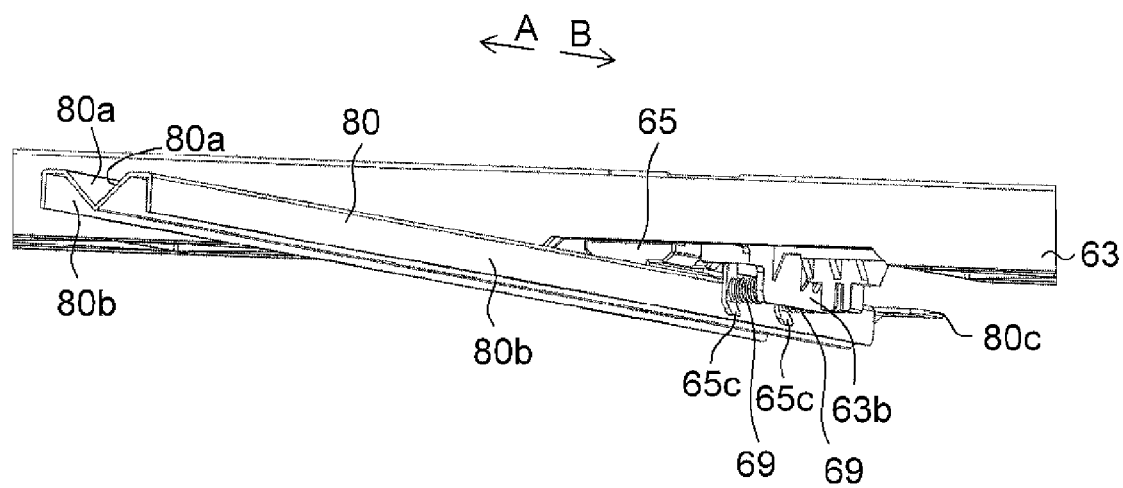
FIG. 9 is a perspective view showing the structure of a slider, a rail portion, and a carriage in an image reading device according to one embodiment of the present disclosure.

The side wall portions 80b are held by the gripping portions 65c of the slider 65 from both sides in the main scanning direction. Specifically, as shown in FIGS. 6 and 9, in a part of the carriage 63 around the slider 65, support wall portions 63b are provided which protrude downward. Between the support wall portions 63b and the gripping portions 65c, compression coil springs (a first biasing member) 69 are provided. Thus, the gripping portions 65c are biased inward in the main scanning direction (toward the rail portion 80) so as to press the side wall portions 80b of the rail portion 80. This prevents the slider 65 from moving (being displaced) in the main scanning direction relative to the rail portion 80, and thereby prevents the fastening projections 65a from moving up across the inclined surfaces 80a.

The fastening portion 80c is a portion that is fastened to the casing 64 with a screw, and is provided at one end of the rail portion 80 in the sub scanning direction. The fitting portion 80d (see FIG. 4) has formed in it an elongate hole that extends in the sub scanning direction, and a screw (not illustrated) is inserted in the elongate hole. Thus, the fitting portion 80d is movable in the sub scanning direction relative to the casing 64. That is, the rail portion 80 is fixed at one place only in its longitudinal direction (the sub scanning direction) relative to the casing 64. The fastening portion 80c may instead be provided elsewhere than at one end of the rail portion 80 (for example, in a central part of it) in the sub scanning direction.

The fastening portion 80c and the fitting portion 80d are fixed to, for example, the top surface (not illustrated) of the lower frame 64a. The fastening portion 80c and the fitting portion 80d may instead be fixed to other than the top surface of the lower frame 64a (for example, to its bottom surface) or to the upper frame 64b.

The driving device 90 includes an endless driving belt 90a which engages with the engagement projection 63a of the carriage 63 to pull it, and a motor (not illustrated) such as a pulse motor which drives the driving belt 90a to rotate. The driving belt 90a is arranged so as to extend in the sub scanning direction (the direction indicated by arrows A and B). When a driving force is transmitted from the motor to the driving belt 90a, the driving belt 90a rotates, and an optical unit 70 moves reciprocally in the direction indicated by arrows A and B along the rail portion 80.

With the structure described above, when a document image is read by a fixed-document method, first, a document (not illustrated) is placed, image surface down, on the hand-placed document contact glass 25a. Then, while the image surface of the document is irradiated with the light from the light source, the scanner unit 62 is moved at a predetermined speed in the direction indicated by arrow A from the scanner home side (the left side in FIG. 3) to the scanner return side (the right side in FIG. 3). Thus, the light reflected from the image surface is focused as image light on the CIS sensor 62a. The image light thus focused is decomposed into pixels by the CIS sensor 62a, and is thereby converted into an electrical signal reflecting the density at each pixel, thus achieving image reading.

On the other hand, when a document image is read by a sheet-through method, the scanner unit 62 is moved to right under an image reading region (image reading position) of the automatic reading contact glass 25b. Then, while the image surface of one document sheet after another transported successively while being lightly pressed against the automatic reading contact glass 25b is irradiated with the light from the light source, the image light reflected from the image surface is focused on the CIS sensor 62a, thereby achieving image reading.

In the embodiment, as described above, a rail portion 80 formed of sheet metal is provided to support the optical unit 70 such that it is slidable in the sub scanning direction. This helps reduce cost as compared with using a metal shaft as the rail portion 80. It also helps suppress deformation of the rail portion 80 as compared with using a resin member as the rail portion 80. In this way, it is possible to suppress lowering of image reading accuracy when the optical unit 70 is scanned in the sub scanning direction.

As described above, the surfaces of the sliding portions 65b have a substantially arc-shaped cross section, and the rail portion 80 has two inclined surfaces 80a which make contact with the substantially arc-shaped surfaces (the surfaces of the sliding portions 65b) at two points as seen in a cross-sectional view. Thus, even when there are dimensional errors, the sliding portions 65b and the rail portion 80 make contact with each other at two points as seen in a cross section. This prevents the sliding portions 65b and the rail portion 80 from rattling against each other. In this way, it is possible to prevent vibration from occurring when the optical unit 70 is scanned in the sub scanning direction, and thus to further suppress lowering of image reading accuracy.

In addition, it is possible to suppress, when the optical unit 70 is scanned in the sub scanning direction, displacement of the center position of the optical unit 70 in the main scanning direction between the image-top and image-bottom ends.

The optical unit 70 is provided with the gripping portions 65c which grip the rail portion 80 from both sides in the main scanning direction. Thus, even when a force acts on the optical unit 70 in the main scanning direction (laterally) or rotationally within the horizontal plane, the substantially arc-shaped portions (sliding portions 65b) are prevented from moving up across the inclined surfaces 80a. Thus, it is possible to prevent the sliding portions 65b from being displaced or rotating relative to the rail portion 80. Incidentally, in a case where the sliding portions 65b and the rail portion 80 are so structured that a substantially arc-shaped surface abuts two inclined surfaces 80a at two points, if no gripping portions 65c are provided, the substantially arc-shaped portions (sliding portions 65b) tend to move up across the inclined surfaces 80a. Thus, when a force acts on the optical unit 70 in the main scanning direction (laterally) or rotationally within the horizontal plane, the arc-shaped portions (sliding portions 65b) move up across the inclined surfaces 80a, and thus the sliding portions 65b are displaced, or rotate, relative to the rail portion 80.

As described above, the gripping portions 65c are elastically deformable in the main scanning direction, and the optical unit 70 is provided with compression coil springs 69 which bias the gripping portions 65c toward the rail portion 80. Thus, deformation of the gripping portions 65c in the main scanning direction allows the sliding portions 65b to move slightly in the main scanning direction relative to the rail portion 80. Thus, even when there are dimensional errors, the sliding portions 65b and the rail portion 80 can more reliably be kept in contact at two points as seen in a cross-sectional view.

As described above, the rail portion 80 is fixed at one place in its longitudinal direction (the sub scanning direction) relative to the casing 64. Thus, as opposed to in a case where the rail portion 80 is fixed at two or more places in its longitudinal direction relative to the casing 64, it is possible to prevent deformation of the rail portion 80 due to a difference in thermal expansion coefficient between the casing 64 and the rail portion 80 in response to a rise in the ambient temperature. Even when the casing 64 deforms due to poor flatness of the installation site, it is possible to prevent the deformation of the casing 64 from affecting the rail portion 80. In this way, it is possible to suppress deformation of the rail portion 80, and thus to further suppress lowering of image reading accuracy when the optical unit 70 is scanned in the sub scanning direction.

As described above, the optical unit 70 includes a CIS sensor 62a, which is a close-contact sensor. Being lightweight and requiring close contact, the CIS sensor 62a tends to cause displacement of the optical unit 70 due to slidability of the optical unit 70 (slidability of the sliding members 67) relative to the contact glass 25. Accordingly, in a case where the CIS sensor 62a is used, it is particularly effective to suppress lowering of image reading accuracy.

The embodiment disclosed herein is in every aspect illustrative and not restrictive. The scope of the present disclosure is defined not by the description of the embodiment presented above but by the appended claims, and encompasses any modifications within the sense and scope equivalent to those of the claims.

For example, although the embodiment described above deals with, as an example of an image reading device according to the present disclosure, an image reading device for incorporation in an image forming apparatus, the present disclosure is applicable equally to image scanners or the like that are used as units separate from image forming apparatuses.

Although the embodiment described above deals with an example where an optical unit adopting a CIS sensor method is used, this is not meant to limit the present disclosure; it is also possible to use, for example, an optical unit adopting a CCD sensor method. That is, the second biasing member may be omitted from the optical unit.

Figure 10:
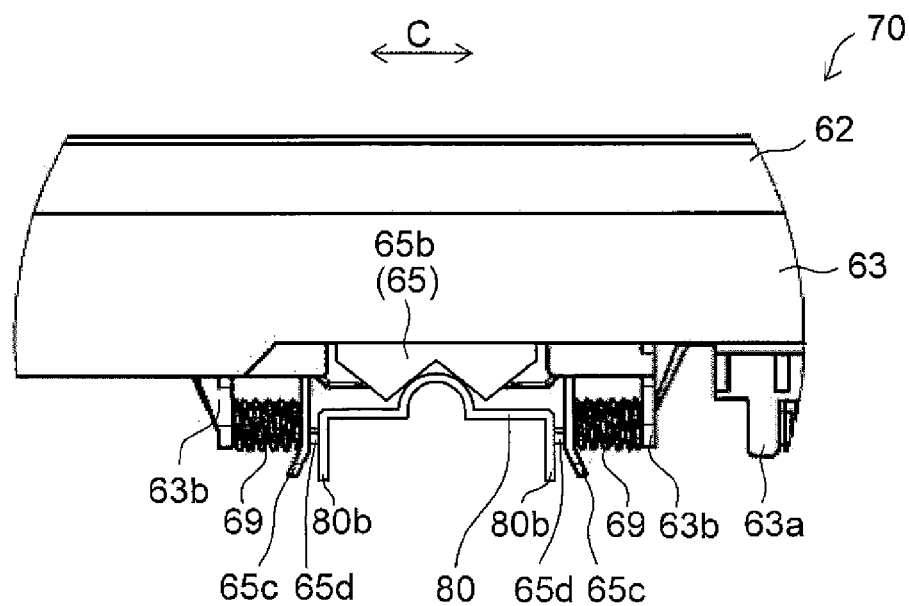
FIG. 10 is an enlarged view showing the structure of and around a slider and a rail portion in an image reading device according to a modified example of the present disclosure.
Figure 11:
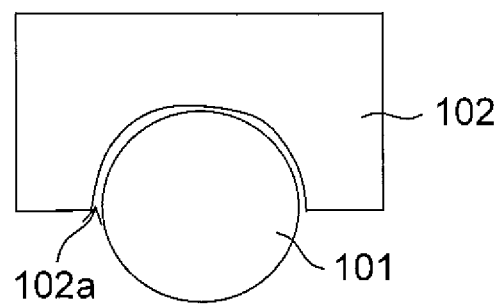
FIG. 11 is an enlarged sectional view showing the structure of a shaft (rail portion) and a bearing (sliding portion) in a conventional image reading device.
Figure 12:
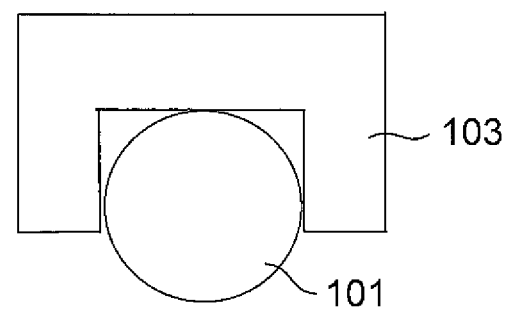
FIG. 12 is an enlarged sectional view showing the structure of a shaft (rail portion) and a sliding portion in another example of a conventional image reading device.

Although the embodiment described above deals with an example where the surfaces of the sliding portions have a substantially arc-shaped cross section and the rail portion has two inclined surfaces, this is not meant to limit the present disclosure. Instead, for example as in the image reading device shown in FIG. 10 as a modified example of the present disclosure, the surface of the rail portion 80 may have a substantially arc-shaped cross section and the sliding portions 65b of the slider 65 may have two inclined surfaces. However, since the rail portion 80 is formed of sheet metal, it is easier to form the rail portion 80 such that it has two inclined surfaces 80a than such that it has a substantially arc-shaped cross section.

Although the embodiment described above deals with an example where the sliding portions are resin-molded integrally with the slider, this is not meant to limit the present disclosure; the sliding portions may instead be formed, for example, out of a metal shaft. Even in that case, it is possible to reduce the amount of the metal shaft used, and thus to reduce cost, as compared with forming the rail portion out of a metal shaft.

Although the embodiment described above deals with an example where a first biasing member is provided to bias the gripping portions toward the rail portion, this is not meant to limit the present disclosure; the first biasing members may be omitted. In that case, the gripping portions may be formed with a shorter distance between them so that when the slider is attached to the rail portion, the gripping portions fit on the rail portion.

What is claimed is:
1. An image reading device comprising:
a contact glass on which a document is placed;
an optical unit arranged under the contact glass, the optical unit being scanned in a sub scanning direction to read an image on the document placed on the contact glass; and
a rail portion extending in the sub scanning direction, the rail portion supporting the optical unit such that the optical unit is slidable in the sub scanning direction,
wherein
the optical unit includes
a sliding portion which slides on the rail portion while keeping contact therewith, and
at least one pair of gripping portions which grip the rail portion from opposite sides in a main scanning direction,
a surface of one of the sliding portion and the rail portion has an arc-shaped cross section, and
the other of the sliding portion and the rail portion has two inclined surfaces that make contact with the arc-shaped surface at two points as seen in a cross-sectional view.

2. The image reading device according to claim 1, wherein
the gripping portions are elastically deformable in the main scanning direction, and
the optical unit includes a gripping portion biasing member which biases the gripping portions toward the rail portion.

3. The image reading device according to claim 1, further comprising a frame in which the optical unit and the rail portion are housed,
wherein the rail portion is fixed to the frame at one place in the sub scanning direction.

4. The image reading device according to claim 1, wherein
the surface of the sliding portion has the arc-shaped cross section, and
the rail portion has the two inclined surfaces.

5. The image reading device according to claim 1, wherein the optical unit includes
a scanner unit which reads the image on the document,
a carriage which holds the scanner unit, and
a scanner unit biasing member which is provided on the carriage and which biases the scanner unit toward the contact glass.

6. An image forming apparatus comprising the image reading device according to claim 1.

7. An optical unit arranged under a contact glass and scanned in a sub scanning direction to read an image on a document placed on the contact glass, the optical unit comprising:
a sliding portion which slides on a rail portion while keeping contact therewith; and
at least one pair of gripping portions which grip the rail portion from opposite sides in a main scanning direction, wherein
a surface of one of the sliding portion and the rail portion has an arc-shaped cross section, and
the other of the sliding portion and the rail portion has two inclined surfaces that make contact with the arc-shaped surface at two points as seen in a cross-sectional view.

\* \* \* \* \*